(12) United States Patent
Wong et al.

(10) Patent No.: US 6,931,490 B2
(45) Date of Patent: Aug. 16, 2005

(54) SET ADDRESS CORRELATION ADDRESS PREDICTORS FOR LONG MEMORY LATENCIES

(75) Inventors: Wayne A. Wong, Seattle, WA (US); Christopher B. Wilkerson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 857 days.

(21) Appl. No.: 09/738,088

(22) Filed: Dec. 15, 2000

(65) Prior Publication Data

US 2002/0078061 A1 Jun. 20, 2002

(51) Int. Cl.[7] .............................................. G06F 12/08
(52) U.S. Cl. ...................................... 711/128; 711/137
(58) Field of Search ................................. 711/128, 137

(56) References Cited

U.S. PATENT DOCUMENTS 4,807,110 A  2/1989 Pomerene et al.
6,516,389 B1 * 2/2003 Uchihori .................... 711/137

OTHER PUBLICATIONS

Alexander, T., et al. "Distributed Prefetch–buffer/Cache Design For High Performance Memory System," The Second International Symposium on High–Performance Computer Architecture, pp. 254–263, Feb. 1996. [Online] Available: http://citeseer.nj.nec.com/alexander96distributed.html.
Charney, M. J., et al., "Prefetching And Memory System Behavior Of The SPEC95 Benchmark Suite," IBM Journal of Research & Development, vol. 41, No. 3, 25 pages, May 1997. [Online] Available: http://www.research.ibm.com/journal/rd/413/charney.html.
Joseph, D., et al. "Prefetching Using Markov Predictors," The Twenty–fourth Annual Symposium on Computer Architecture, pp. 252–263, Jun. 1997. [Online] Available:http://citeseer.nj.nec.com/joseph97prefetching.html.

* cited by examiner

*Primary Examiner*—Reginald G. Bragdon
(74) *Attorney, Agent, or Firm*—Blakely, Sokoloff, Taylor and Zafman

(57) ABSTRACT

Set address correlation correlates between addresses belonging to a common address set. Addresses are grouped into address sets and correlations are created between addresses by set. The correlations are used to predict future addresses based on current addresses.

20 Claims, 5 Drawing Sheets

120

| time | 0 | 1 | 2 | 3 | 4 | 5 | 6 | 7 | 8 | 9 |
|---|---|---|---|---|---|---|---|---|---|---|
| referenced address | A | B | C | D | E | F | G | A | H | B |
| set | 0 | 0 | 1 | 2 | 3 | 0 | 1 | 0 | 2 | 0 |
| miss? | Y | Y | Y | Y | Y | Y | Y | Y | Y | N |

100

|  | 111 | 113 |
|---|---|---|
|  | key address | successor address |
| 101 | A | B |
| 103 | B | F |
| 105 | C | G |
| 107 | F | A |
| 109 | D | H |

| set 211 | previous address 213 |
|---|---|
| 201  0 | -- |
| 203  1 | -- |
| 205  2 | -- |
| 207  3 | -- | time 0

| set 211 | previous address 213 |
|---|---|
| 201  0 | A |
| 203  1 | -- |
| 205  2 | -- |
| 207  3 | -- | time 1

| set 211 | previous address 213 |
|---|---|
| 201  0 | B |
| 203  1 | -- |
| 205  2 | -- |
| 207  3 | -- | time 2

| set 211 | previous address 213 |
|---|---|
| 201  0 | B |
| 203  1 | C |
| 205  2 | -- |
| 207  3 | -- | time 3

| set 211 | previous address 213 |
|---|---|
| 201  0 | B |
| 203  1 | C |
| 205  2 | D |
| 207  3 | -- | time 4

| set 211 | previous address 213 |
|---|---|
| 201  0 | B |
| 203  1 | C |
| 205  2 | D |
| 207  3 | E | time 5

| set 211 | previous address 213 |
|---|---|
| 201  0 | F |
| 203  1 | C |
| 205  2 | D |
| 207  3 | E | time 6

| set 211 | previous address 213 |
|---|---|
| 201  0 | F |
| 203  1 | G |
| 205  2 | D |
| 207  3 | E | time 7

| set 211 | previous address 213 |
|---|---|
| 201  0 | A |
| 203  1 | G |
| 205  2 | D |
| 207  3 | E | time 8

| set 211 | previous address 213 |
|---|---|
| 201  0 | A |
| 203  1 | G |
| 205  2 | H |
| 207  3 | E | time 9

Figure 2

SET ADDRESS CORRELATION ADDRESS PREDICTORS FOR LONG MEMORY LATENCIES

FIELD OF THE INVENTION

This invention relates generally to address prediction, and more particularly to using address correlation to predict addresses.

BACKGROUND OF THE INVENTION

Address correlations can be used to predict the addresses of future instructions to be referenced during execution of code within a processing unit. This form of address speculation is useful in applications such as cache pre-fetching or instruction scheduling. A simple address-address correlation consists of a key and successor value pair. A predictor that uses address-address correlation observe the previous address pairs, stores them, and uses them as predictions of future addresses. The correlations are typically stored in a correlation prediction table indexed by the key. The current address value is used as the key to retrieve the corresponding correlation and successor value predicts the future address.

For example, when used with cache pre-fetching, address-address correlations are built from the cache miss addresses to predict future miss addresses. When a cache miss is generated, the preceding cache miss address and the current cache miss address are stored in a correlation prediction table as a key and successor value pair. The next time the key address generates a cache miss, the corresponding entry in the correlation prediction table predicts that the successor address will be the next cache miss.

The basic address-address correlation scheme has been extended to allow for multiple correlation value addresses to increase prediction accuracy. In these multiple value address correlations, the correlation values are maintained with an least-recently-used replacement policy and the successor value addresses are pre-fetched with a most-recently-used priority.

To maximize the opportunity for hiding memory access latency with cache pre-fetching, the pre-fetch should be initiated such that the data arrives in a timely manner. Traditionally, pre-fetching data from the cache too early was a concern. If the data is pre-fetched too early, the pre-fetched data might displace other useful data from the cache, or the pre-fetched data itself might be displaced by other references before the pre-fetched data can be used. Conversely, if the pre-fetch is not initiated sufficiently ahead of when the data is required, the inherent latency of the memory will not be hidden. Given the trend of increasing relative memory latency, the issue is no longer whether the pre-fetching is too early but whether the pre-fetching is early enough to hide the long memory latency.

Although increasing the correlation distance, i.e., the number of references between addresses from which correlations are built, increases the timeliness of correct predictions for address-address correlations, it has a significant adverse effect on the absolute number of correct predictions. Thus, current address-address correlation schemes are unable to initiate pre-fetches early enough to hide long memory latencies without sacrificing prediction coverage.

BRIEF DESCRIPTION OF THE DRAWINGS

FIG. 1 is a diagram illustrating a set address correlation table according to one embodiment of the invention;

FIG. 2 is a diagram illustrating one embodiment of a set address history table used to create the set address correlation table of FIG. 1;

DETAILED DESCRIPTION OF THE INVENTION

Figures 3A, 3B:
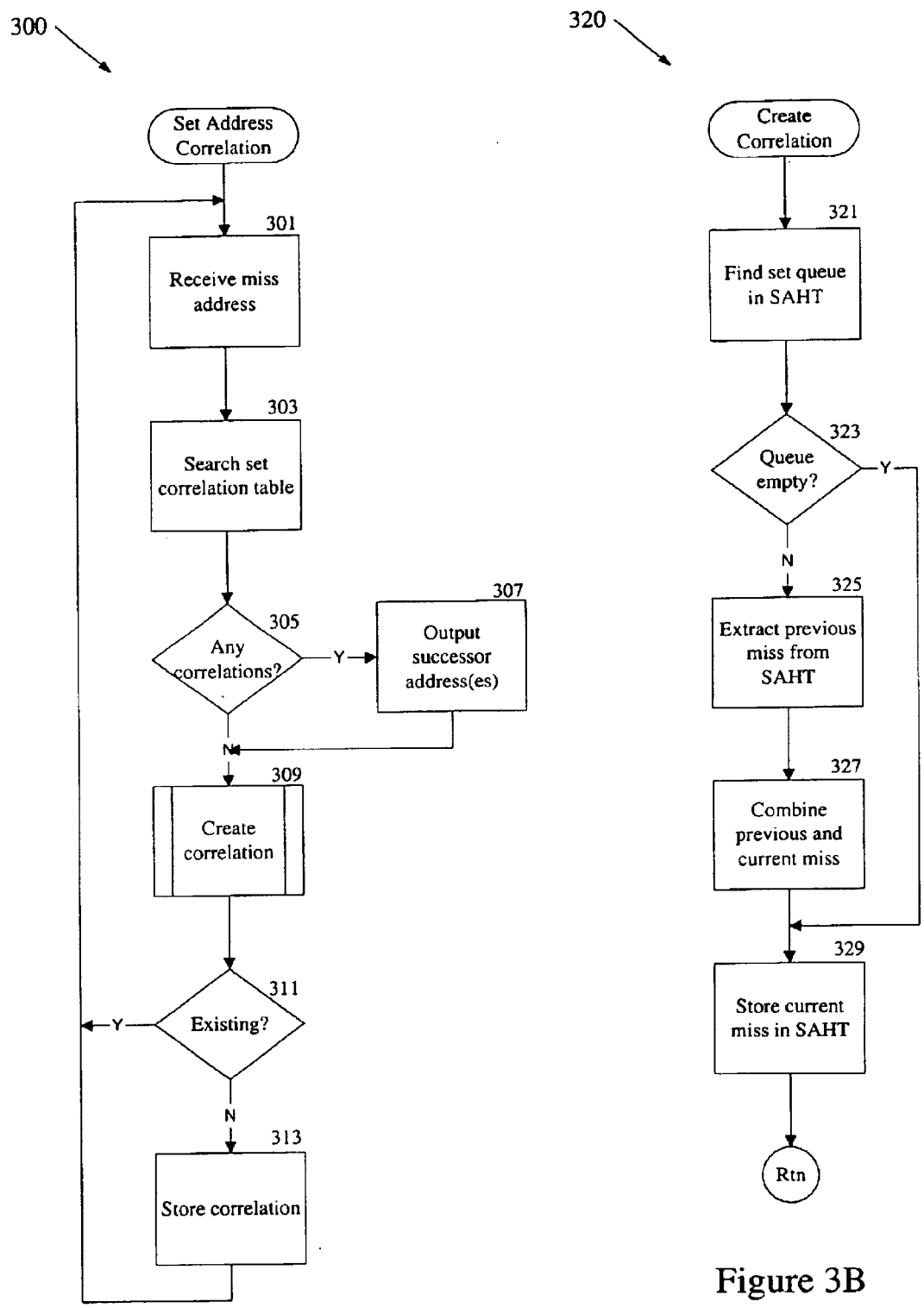
FIG. 3A is a flowchart of a method for performing set address correlation according to one embodiment of the invention.
FIG. 3B is a flowchart of a method for creating a correlation in support of the method of FIG. 3A.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Set address correlation correlates between addresses belonging to a common address set, rather than correlating between immediately successive addresses as in prior art address-address correlators. Addresses are grouped into address sets and correlations are created between addresses by set. The correlations are used to predict future addresses based on current addresses observed in an address stream.

For example, when set address correlation is used to predict cache misses, the addresses in a main memory are grouped into address sets, correlations are built between addresses in the same address set, and the correlations predict the next miss for an address set when a cache miss in the same address set is observed. In one embodiment, each memory address contains a cache index set value and the address space of the main memory is partitioned into address sets based on the cache index set value. Alternative address grouping algorithms that do not depend on the memory address, such as using the value of the program counter, are also contemplated as within the scope of the invention.

FIG. 1 illustrates a set correlation table 100 constructed by one embodiment of a set address correlator from cache misses that appears in an address stream 120. Each entry in the set correlation table 100 is keyed on the address of a cache miss 111 in an address set and contains the address for a subsequent cache miss 113 observed in the same address set. Thus, the correlations of the present invention are created between cache misses within the same address set instead of between successive miss addresses.

Referring to the address stream 120, at time 0, the current cache miss is address A in address set 0. Because this is the first miss in the stream 120, no correlation is made. At time 1, the current miss address is B in address set 0. Because the previously missed address A is in the same address set as the current miss address B, a correlation 101 is stored in the set correlation table 100 and keyed on the miss address A. At time 2, the current miss address is C in address set 1. Because no previous missed address in address set 1 has appeared in the stream 120, no correlation is stored in the table 100. Similarly, at times 3 and 4, no correlations are stored because the current miss addresses are the first within their respective address sets. At time 5, the current miss address F is in address set 0 so a correlation 103 is created between B, the previous missed address in address set 0, and F. At time 6, a correlation 105 is created between C, the previous missed address in address set 1, and G, the current missed address in address set 1. Similarly, correlations 107 and 109 are created at times 7 and 8 for address sets 0 and 2, respectively.

Because set address correlation builds correlations between addresses within the same address set instead of between consecutive misses, the next immediate miss is not necessarily predicted. For example, when address A is missed at time 7, the next immediate miss at time 8 is not address B as predicted by correlation 101, but address H. However, the correlation 101 causes address B to be pre-fetched when address A is missed at time 7, so address B will either be in the cache when it is referenced at time 9 or in the process of being read into the cache, thus hiding some or all of the memory latency necessary to retrieve address B.

In one embodiment, set address correlation uses a set address history table (SAHT) to record the previous miss address for each address set and builds the correlations from the data in the SAHT. FIG. 2 illustrates one embodiment of a SAHT 200 and the changes in the SAHT 200 as the address stream 120 is evaluated by the set address correlator previously described.

The SAHT 200 contains a single entry for each address set that serves as a FIFO (first in first out) queue 201, 203, 205, 207. Each queue stores the previous miss address 213 for the address set and is keyed on the address set value 211. When a cache miss is encountered in the address stream 120, the address set value of the current miss address is used to search the SAHT 200. If a previous miss address 213 is in the corresponding queue, set address correlation creates a correlation for the address set in the set correlation table 100 from the previous miss address 213 in the queue and the current miss address. The queue is updated with the current miss address.

Referring again to the address stream 120, at time 0, no entries exist in the SAHT 200. The address set value 0 of the current miss address A is used to search the SAHT 200. No previous miss address 213 is found in the queue 201 for address set 0, so no correlation is created. The current miss address is stored in the queue 201 to create the SAHT 200 shown at time 1. At time 1, the address set value 0 of the current miss address B is used to search the SAHT 200. Address A is retrieved from the queue 201 for address set 0 and used to create the correlation 101 in the set correlation table 100. Address B replaces address A in the queue 201. At times 2, 3 and 4, the queues 203, 205 and 207 for address sets 1, 2 and 3, respectively, are created from the cache misses in the address stream 120. Because these are the first entries in their respective queues, no correlations are created by the set address correlator. At time 5, the queue 201 for address set 0 is once again searched and the correlation 103 is created between the previous miss address B 213 in the queue 201 and the current miss address F. Address F replaces address B in the queue 201. Similarly, at time 6, the previous miss address C 213 in the queue 203 for address set 1 is used to create correlation 105 and the current miss address G is stored in the queue 203. At time 7, the current miss address A is in address set 0 so the set address correlator creates correlation 107 from the previous miss address F in queue 201 and replaces address F with address A in the queue 201. At time 8, the set address correlator creates correlation 109 from previous miss address D in the queue 205 and the current miss address H and replaces address D with address H in queue 205. At time 9, there is no cache miss because address B was pre-fetched at time 7 using correlation 101, and thus the queue 201 for address set 0 is not updated, leaving the SAHT 200 unchanged from the beginning of time 9.

In an alternate embodiment, the SAHT 200 could also be updated with pre-fetch hits so that at time 9, queue 201 for address set 0 would be updated by replacing address A with the pre-fetch hit address B. When a pre-fetch hit is recorded in the SAHT 200, the corresponding correlation, e.g. A→B, can be given a higher priority in the set correlation table 100 to prevent it from being replaced as described further below. Thus, recording pre-fetch hits strengthens successful correlations.

One of skill in the art will readily appreciate that table configurations other than that illustrated for the SAHT 200 may be used by set address correlation to record the previous misses and are considered within the scope of the invention. Alternate embodiments in which other types of data structures, such as logical chains, are used to record address histories are also contemplated as within the scope of the invention.

Turning now to FIGS. 3A and 3B, exemplary methods of the invention are described in terms of executable instructions with reference to flowcharts. Describing the methods by reference to a flowchart enables one skilled in the art to develop such instructions to perform the operations of the methods within a processing unit. The executable instructions may be written in a computer programming language or may be embodied in firmware. Furthermore, it is common in the art to speak of executable instructions, in one form or another (e.g., program, procedure, process, application, module, logic . . . ), as taking an action or causing a result. Such expressions are merely a shorthand way of saying that execution of the instructions by a processing unit causes the processing unit to perform an action or a produce a result.

FIG. 3A is a flowchart of one embodiment of a set address correlation method 300. Upon receipt of a miss address (block 301), the method 300 uses the current miss address to search a set correlation table for existing correlations (block 303). In one embodiment, the set correlation table contains a single correlation keyed on each miss address, as illustrated by the set correlation table 100 in FIG. 1. In an alternate embodiment, the set correlation table contains a pre-defined number of correlation "slots" keyed on the miss address. In a particular alternate embodiment, the number of correlation slots per miss address key is four.

Assuming one or more correlations are found in the set correlation table (block 305), the method 300 outputs the successor addresses for use in pre-fetching the data from memory (block 307). In one embodiment, when the set correlation table contains multiple correlation slots per miss address key, a most-recently-used priority for each successor address is also output. The priority is used to determine the order in which to pre-fetch the addresses. Priority orders other than most-recently-used is contemplated as within the scope of the invention.

The current miss address is also used to create a correlation with a prior miss address in the same address set, if one exists (block 309). One embodiment of a method that creates a correlation between current and previous miss addresses is described in detail in conjunction with FIG. 3B below, If the identical correlation does not already exist in the set correlation table (block 311), the newly-created correlation is stored (block 313). In an embodiment in which a miss address can have only one correlation and a correlation already exists, the current miss address is stored as the successor address in the correlation. In embodiments in which the set correlation table contains multiple correlation slots per key and all the correlation slots for the key already exist, the current miss address replaces the existing successor address in one of the correlation slots. The choice of the correlation slot may rely on a least-recently-used or other replacement algorithm.

It will be appreciated that while the flowchart in FIG. 3A presents the set address correlation method 300 as a single logic flow, the retrieval and output of existing correlations may be performed in parallel with the creation and storing of a new correlation.

FIG. 3B is a flowchart of one embodiment of a create correlation method 320 described briefly above,. The embodiment shown in FIG. 3B employs a set address history table (SAHT) such as SAHT 200 in FIG. 2. The method 320 uses the set value of the current miss address to find the appropriate queue in the SAHT (block 321). If the queue contains a previous miss address (block 323), the previous miss address is extracted from the queue (block 325) and combined with the current miss address to form the correlation (block 327). The current miss address replaces the previous miss address in the queue (block 329). The newly-created correlation is returned to the set address correlation method 300. If, however, the queue is empty at block 323, the current miss address is stored in the queue at block 329 and no correlation is returned.

While the create correlation method 320 is illustrated in FIG. 3B as a single logical flow, it will once again be appreciated that the processing may be performed in parallel, e.g., the processing represented by block 327 could proceed in parallel with the processing represented by block 329.

Furthermore, while the methods of the inventions have been described as including all the acts from 301 until 313 in FIG. 3A, and from 321 until 329 in FIG. 3B, one of skill in the art will immediately recognize that the processing represented by the blocks in the flowcharts can be rearranged, and that the acts necessary to practice the invention may encompass more or less processing than described.

Set address correlation that correlates between addresses belonging to common address sets has been described. While the invention is not limited to any particular configuration of tables, for sake of clarity, specific embodiments of set correlation and set address history tables have been have been used as examples. Furthermore, although the invention as been described in terms of cache miss addresses, it will be appreciated that set address correlation is also applicable to predict future address references in other applications. For example, when used with instruction scheduling, the set address correlation can create references between successively referenced instruction addresses within a group of instructions to predict future instructions.

Set address correlation implicitly increases the correlation distance, and thus the pre-fetch time, by separating the addresses into address sets. Successive addresses in the same address set may have in-between them an arbitrary number of references that belong to other sets. Furthermore, the set address correlation predicts references further in the future and its prediction timeliness degrades more gracefully than that of the address-address correlator as the required pre-fetch distance increases. Thus, when compared to the prior art address-address correlators, the set address correlation has better timeliness and offers more opportunity to hide larger memory latencies with similar prediction accuracy.

Figure 4:
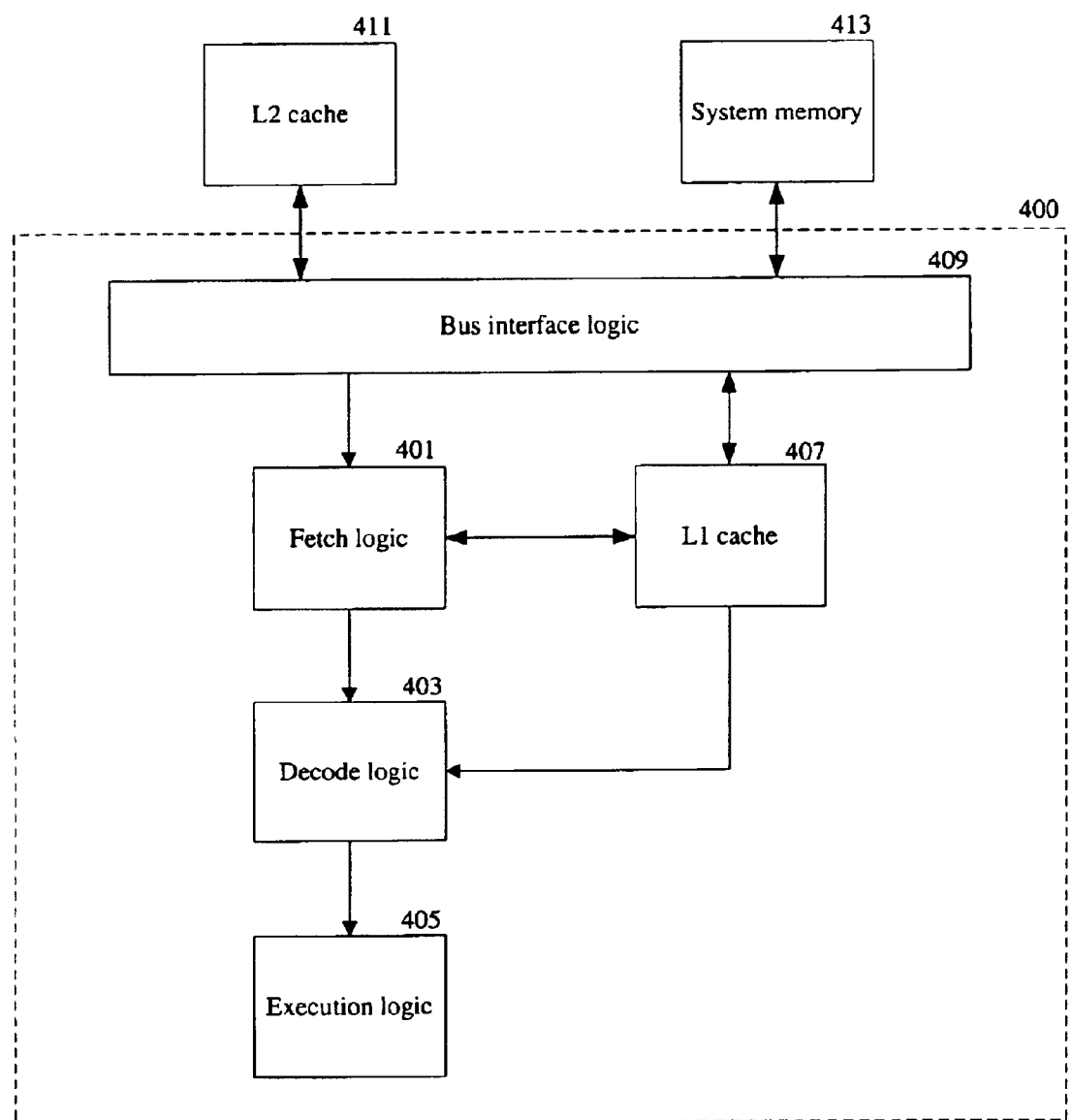
FIG. 4 is a diagram of one embodiment of processing unit in which the present invention may be practiced.
Figure 5:
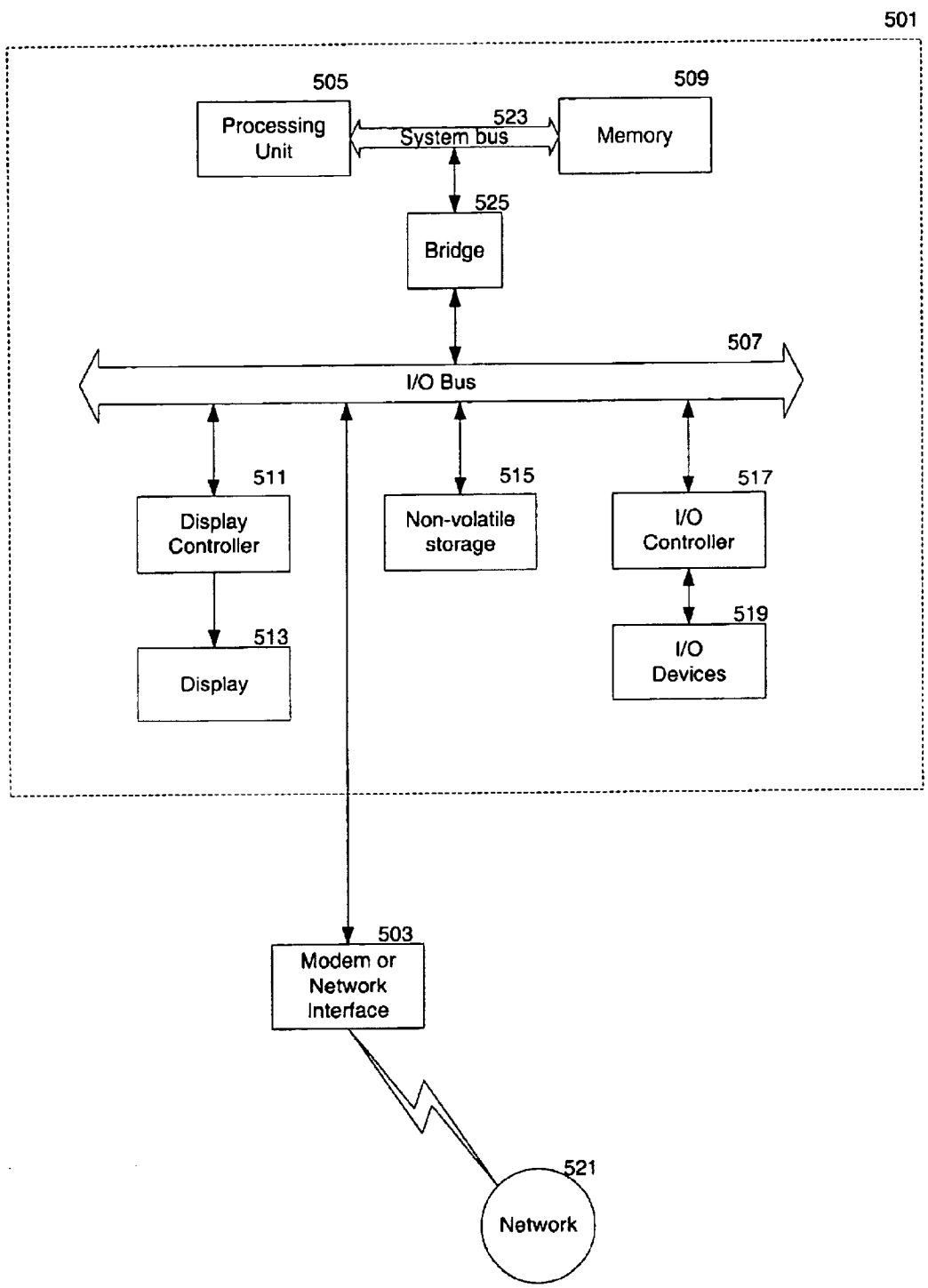
FIG. 5 is a diagram of one embodiment of a computer system in which the processing unit of FIG. 4 may incorporated.

The following descriptions of FIGS. 4 and 5 are intended to provide an overview of processing units and computer hardware in which embodiments of the invention can be practiced, but is not intended to limit the applicable implementations.

FIG. 4 shows a processing unit 400 containing fetch logic 401, decode logic 403, and execution logic 405, a first level (L1) cache 407, and bus interface logic 409. If the information requested by the fetch logic 401 is not in the L1 cache 407, the L1 cache 407 requests the information from a second level (L2) cache 411 by way of the bus interface logic 409. If the information is not cached in the L2 cache 411, the L2 cache 411 in turn, requests the information from a system memory 413 via the bus interface logic 409. While the L2 cache 411 is illustrated as being external to the processing unit 400, embodiments that include the L2 cache within the processing unit 400 are conventional and encompassed within the description of FIG. 4. The set address correlation of the present invention may be practiced as part of either, or both, the L1 and L2 caches. Additionally, set address correlation can be used with a single level cache. Furthermore, set address correlation may be used by the processing unit 400 to predict future instructions for instruction scheduling. The data structures used by the present invention may be stored in cache or main memory, or may be implemented in firmware in the processing unit 400.

FIG. 5 shows one example of a conventional computer system 501 containing a processing unit 505, such as processing unit 400, that incorporates the invention. Memory 509, analogous to system memory 413, is coupled to the processing unit 505 by a system bus 523. Memory 509 can be dynamic random access memory (DRAM) and may also include static RAM (SRAM). A bridge 525 couples the system bus 507 to an input/output (I/O) bus 507, which further couples a display controller 511, non-volatile storage 515, and an I/O controller 517 to the processing unit 505. A modem or other network interface 503 may also be coupled to the I/O bus 507 to connect the computer system 501 to a network 521. The display controller 511 controls, in the conventional manner, a display on a display device 513 which can be a cathode ray tube (CRT) or liquid crystal display. The I/O devices 519 controlled by the I/O controller 517 can include a keyboard, disk drives, printers, a scanner, and other input and output devices, including a mouse or other pointing device. The display controller 511 and the I/O controller 517 can be implemented with conventional, well-known technology. The non-volatile storage 515 is often a magnetic hard disk, an optical disk, or another form of storage for large amounts of data. Some of this data, including executable instructions, is written into memory 509 during execution of software in the computer system 501. One of skill in the art will immediately recognize that the term "machine-readable medium" includes any type of storage device that is accessible by the processing unit 505. Thus, a machine-readable medium includes any mechanism that provides (i.e., stores and/or transmits) information in a form readable by a machine (e.g., a computer). For example, a machine-readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

It will be appreciated that the computer system 501 is one example of many possible computer systems which have different architectures. A typical computer system will usually include at least a processing unit, memory, and a bus coupling the memory to the processing unit.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

What is claimed is:

1. A method comprising:
   creating a correlation for an address set between a current address in the address set and a previous address in the address set, wherein the address set is a pre-defined partition within an address space for a main memory; and
   storing the correlation for the address set.
2. The method of claim 1 further comprising:
   retrieving the correlation for the address set when the previous address is observed in an address stream.
3. The method of claim 1 further comprising:
   grouping addresses into a plurality of address sets.
4. The method of claim 1, wherein creating a correlation for an address set comprises:
   recording the previous address in a set address history data structure;
   retrieving the previous address from the set address history data structure when the current address is observed in an address stream; and
   replacing the previous address in the set address history data structure with the current address.
5. The method of claim 1, wherein the current and previous addresses are cache memory miss addresses.
6. The method of claim 1, wherein the current and previous addresses are instruction addresses.
7. The method of claim 1, wherein storing the correlation comprises:
   determining a slot in a set correlation data structure in which to store the correlation; and
   keying the correlation in the set correlation data structure on the previous address.
8. A machine-readable medium providing instructions, which when executed by a processing unit, causes the processing unit to perform operations comprising:
   creating a correlation for an address set between a current address in the address set and a previous address in the address set, wherein the address set is a pre-defined partition of an address space for a main memory; and
   storing the correlation for the address set.
9. The machine-readable medium of claim 8 providing further instructions comprising:
   retrieving the correlation for the address set when the previous address is observed in an address stream.
10. The machine-readable medium of claim 8 providing further instructions comprising:
    grouping addresses into a plurality of address sets.
11. The machine-readable medium of claim 8 providing further instructions comprising:
    recording the previous address in a set address history data structure;
    extracting the previous address from the set address history data structure when the current address is observed in an address stream; and
    replacing the previous address in the set address history data structure with the current address.
12. The machine-readable medium of claim 11, wherein the set address history data structure comprises:
    an address set field containing data representing the address set; and
    a previous address field containing data representing the previous address for the address set identified by the address set field.
13. The machine-readable medium of claim 8 providing further instructions comprises:
    determining a slot in a set correlation data structure in which to store the correlation; and
    keying the correlation in the set correlation data structure on the previous address.
14. The machine-readable medium of claim 13, wherein the set correlation data structure comprises:
    a key address field containing data representing the previous address; and
    a successor address field containing data representing the current address correlated with the previous address identified by the key address field.
15. An apparatus comprising:
    a processing unit;
    a main memory coupled to the processing unit through a bus, wherein an address space for the main memory is partitioned into address sets;
    set address correlation logic to create a correlation for an address set between a current address in the address set and a previous address in the address set; and
    a set correlation data structure to store the correlation created by the set address correlation logic.
16. The apparatus of claim 15 further comprising:
    a set address history data structure to record the previous address used to create the correlation.
17. The apparatus of claim 15 wherein the set address correlation logic further comprises logic to partition the memory into a plurality of address sets.
18. The apparatus of claim 15, wherein the set address correlation logic further comprises logic to retrieve the correlation from the set correlation data structure when the previous address is observed in an address stream.
19. The apparatus of claim 15, wherein the processing unit comprises cache logic to use the set address correlation logic to predict future cache misses.
20. The apparatus of claim 15, wherein the processing unit comprises instruction scheduling logic to use the set address correlation logic to predict future instructions.

\* \* \* \* \*